United States Patent [19]
Ross

[11] 3,850,761
[45] Nov. 26, 1974

[54] CYANIDE DECOMPLEXING
[75] Inventor: James W. Ross, Richmond, Va.
[73] Assignee: Orion Research Incorporated, Cambridge, Mass.
[22] Filed: Mar. 1, 1973
[21] Appl. No.: 336,934

[52] U.S. Cl. .................................. 204/1 T, 423/364
[51] Int. Cl.. G01n 27/46, C01b 21/00, C01b 31/00
[58] Field of Search ......... 204/1 T, 195 ML, 195 G; 423/364, 371, 372

[56] References Cited
UNITED STATES PATENTS
2,664,396  12/1953  Riley .................................. 423/372
3,582,269  6/1971  Keith et al. ......................... 423/364

OTHER PUBLICATIONS
Front, "Plating," July, 1971, pp. 686–693.
Fleet et al., "Analytical Chemistry," Vol. 43, No. 12, Oct., 1971, pp. 1575–1580.

Primary Examiner—T. Tung
Attorney, Agent, or Firm—Schiller & Pandiscio

[57] ABSTRACT

A method of decomplexing complexes of the cyanides of $Cu^+$, $Ni^{++}$ or $Cr^{+++}$ preparatory to electrochemical measurement of cyanide ion activity. The method involves heating an acidified aqueous solution of the cyanide complex in the presence of a sequestering agent capable of forming, with the metal of the complex, new complexes having stability constants greater than the corresponding cyanide complexes. Heating is conducted below the boiling point of the solution for a time sufficient to dissociate the complex from the $Cu^+$, $Ni^{++}$ or $Cr^{+++}$. The solution is then adjusted to a basic pH value leaving substantially all of the cyanide in the solution in the form of free ions. Preferred sequestering agents include EDTA and CDTA salts.

5 Claims, No Drawings

CYANIDE DECOMPLEXING

This invention relates to ion masking techniques, and more particularly to a process for dissociating or decomplexing complexes of the cyanides of $Cu^+$, $Ni^{++}$ and $Cr^{+++}$ preparatory to electrochemical measurement of cyanide ion activity.

Various monitoring or sensing systems are known in the art for providing information relating to the activity of cyanide ion, or to its concentration. Some of such systems employ ion-sensitive electrodes which are sensitive to cyanide ions and provide electrical signals which are a function of the logarithm of the activity of the cyanide ions, i.e., exhibit a response which is substantially according to the well-known Nernst equation. A number of such electrodes are known which are sensitive to cyanide ions and described in detail in the literature, as for example in R. A. Durst, "Ion-Sensitive Electrodes," *National Bureau of Standards*, Publication No. 314 - 1969. See also copending U.S. Application Ser. No. 279,336 filed Aug. 10, 1972, assigned to the common assignee.

In many instances it is desired to monitor solutions for cyanide ion content; e.g., in industrial waste waters from metal plating, steel coking or other industrial processes. Often, however, these same waste waters, etc., may contain metal ions such as $Hg^{++}$, $Cd^{++}$, $Cr^{+++}$, $Cu^+$, $Ni^{++}$ and $Zn^{++}$, which tend to form stable cyanide complexes. Since known electrodes respond only to ionic activity, the presence of cyanide in the solutions will be at least partially masked by such ions. For solutions containing the metallic ions $Hg^{++}$, $Cd^{++}$ and $Zn^{++}$ which readily dissociate in dilute solutions, it is known that the cyanide ions may be freed by addition of a sequestering or complexing agent (such as ethylene diamine tetraacetic acid (EDTA) salts) which is capable of forming a new and stronger complex with the metallic ions. The new complex is formed by an ion exchange reaction between the metal ion and EDTA.

However, certain metallic ions, in particular $Cu^+$, $Ni^{++}$ and $Cr^{+++}$, form relatively strong complexes with cyanide for which there are no known complexing or sequestering agents which will exchange with the cyanide of such complexes under normal conditions. As a result, much, if not all, of the cyanide in the solution which also contains $Cu^{++}$, $Ni^{++}$ or $Cr^{+++}$, will go undetected using standard electrochemical measurement techniques.

A principal object of the present invention is to provide a novel process for decomplexing cyanide ions from complexes with certain metals.

A more specific object is to provide a method for decomplexing cyanide ions from metals which form relatively strong cyanide complexes, e.g., $Cu^+$, $Ni^{++}$ and $Cr^{+++}$ cyanide complexes, preparatory to electrochemical measurement of cyanide.

Generally, these objects are effected by a procedure involving forced break-up of the $Cu^+$, $Ni^{++}$ and $Cr^{+++}$ cyanide complexes by forming hydrogen complexes of the cyanide, and then exchange reaction formation of new complexes of the metal with a sequestering agent.

It has been observed that the stability of certain known complexes, e.g., of $Cr^{++}$, $Co^{++}$ and $Fe^{++}$ may be more a matter of the speed of the formation and decomposition reactions rather than a function of the free energy of formation (A. F. Wells, *Structural Inorganic Chemistry*, Third Edition, University Press, 1962). Investigation has now shown that the stability of certain complexes of $Cu^+$, $Ni^{++}$ and $Cr^{+++}$ is also related to the speed of the formation and decomposition reactions. Specifically, it has been observed that the speed of reaction of $Cu^+$, $Ni^{++}$ and $Cr^{+++}$ with cyanide is relatively fast, while the speed of reaction with known sequestering agents, e.g., EDTA, under normal conditions, i.e., at basic pH, is relatively slow. As a result, under ordinary circumstances, little or no exchange reaction may occur when cyanide complexes of $Cu^+$, $Ni^{++}$ and $Cr^{+++}$ are simply mixed with the sequestering agent, and the cyanide tends to remain complexed with the metal.

The present invention provides a method of forcing break-up of cyanide complexes of $Cu^+$, $Ni^{++}$ and $Cr^{+++}$ by imposing conditions which compel the formation of new complexes of $Cu^+$, $Ni^{++}$ and $Cr^{+++}$ with selected sequestering agents, thus freeing the cyanide ions.

The method of the present invention involves generally heating an acidified solution of the solution containing the cyanide complexes in the presence of a sequestering agent for a time sufficient to dissociate the cyanide complexes of $Cu^+$, $Ni^{++}$ and $Cr^{+++}$, and thereafter adjusting the pH to a basic value.

Other objects of the invention will in part be obvious and will in part appear hereinafter. The invention accordingly comprises the process including the several steps and relation of one or more of such steps with respect to each other, all of which are exemplified in the following detailed disclosure and the scope of application of which will be indicated in the claims.

The process of the invention employs sequestration agents known in the art.

The sequestering agent should be one which is capable of forming, with the metals $Cu^+$, $Ni^{++}$, and $Cr^{+++}$, complexes with respect to a given one of those metals of sufficient magnitude relative to the stability constants of the various cyanide complexes with that metal, so that the cyanide will be free in the solution. Typical sequentration agents which may be used in the process of the instant invention are soluble salts of cyclohexyl diamine tetraacetic acid (CDTA), ethylene diamine tetraacetic acid (EDTA) and the like. The stability constants of $Cu^+$, $Ni^{++}$ and $Cr^{+++}$ complexes vary depending on the ligand.

A suitable sequestering agent is the Na salt of ethylene diamine tetraacetic acid (EDTA) which forms complexes having stability constants as follows:

| Cu EDTA | $C_{25}$ | $10^{18.8}$ |
| Ni EDTA | $C_{25}$ | $10^{18.6}$ |
| Cr EDTA | $C_{25}$ | $10^{23}$ |

The amount of sequestering agent added will depend on the level of $Cu^+$, $Ni^{++}$ and $Cr^{+++}$ metal present in the solution. In normal waste waters the amount of metal present normally is not substantially greater than the amount of cyanide, in which case $10^{-3} - 10^{-4}$M solutions of sequestering agent are adequate. If higher levels of metals are expected, i.e., in large excess compared to the total cyanide, $10^{-2}$M or more of sequestering agent may be required.

The solution may be acidified by addition of any acid (such as an inorganic acid such as dilute hydrochloric acid, and the like, or an organic acid such as acetic acid and the like) which will not oxidize cyanide. The pH of the sample is adjusted to an acid value short of precipitating the sequestering agent. For practical purposes for most sequestering agents useful in the process, the lower limit for the pH is thus about 4.

The acidified solution is heated to a temperature below the boiling point thereof, typically in the range of 50° – 90°C., for a time sufficient to substantially completely dissociate any $Cu^+$, $Ni^{++}$ and $Cr^{+++}$ cyanide complexes therein. Typically heating will be continued for from about 1 to about 20 minutes preferably about 10 minutes. If high levels of metal cyanide complexes are expected, it may be preferred to operate at the upper end of the preferred temperature range and heat for about 20 minutes or even longer.

Heating the metal-cyanide complex in acid solution in the presence of the sequestering agent breaks up the complex. The solution is then cooled, and the pH of the solution is adjusted to a basic value, typically in excess of about 10. Since the sequestering agent has a stability constant greater than the metal-cyanide complex, reaction formation with the sequestering agent is favored over reformation of complexes with cyanide. Accordingly, the freed metal ions will have reacted with the sequestering agent to form new stable complexes, leaving free cyanide ions in solution. No loss of cyanide, i.e., as HCN, will be noted as indicated by the absence of any odor of HCN.

The nature of the substitution reactions involved in the present invention may be seen from the following reactions illustrative for decomplexing cupric cyanide complex with EDTA:

In acid solution, under heat, the cuprous cyanide complex breaks up into cuprous ions and cyanide ions:

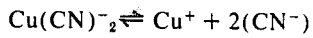

(1)

The $Cu^+$ ions will complex with the selected sequestering agent e.g., EDTA as follows:

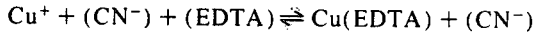

(2)

EXAMPLE I

A. Complex preparation:

A $Cu^+$— cyanide complex-containing solution is prepared by titrating KCN solution with Cu solution in a beaker. The beaker contains two electrodes, a cyanide-sensing electrode and a double junction reference electrode (respectively Model Nos. 94-06 and 94-19 available commercially from Orion Research Incorporated, Cambridge, Mass.). Each electrode is connected to an amplifier and readout meter (Model 801 pH/mv meter available commercially from Orion Research Incorporated, Cambridge, Mass.).

An 100 ml. portion of the approximately 1M KCN is placed in the beaker and a potential reading is taken and recorded.

The solution is then titrated with 1M $CuCl_2$. The solution is stirred for 30 seconds after each addition of $CuCl_2$ and electrode readings are then taken and plotted on rectilinear paper in known manner. Addition of $CuCl_2$ is contained until meter reading corresponding to about 98–99 percent of the way to the first endpoint (formation of $Cu(CN_2)$) is achieved as indicated by a sudden rapid change in the potentiometric reading.

This leaves a slight excess of cyanide which is desirable to prevent precipitation of CuCN.

B. Decomplexing and Electrochemical Measuring

To a 100 ml. portion of this K $Cu(CN)_2$ solution is added 1 ml of $10^{-1}$ M disodium EDTA as sequestering agent. The pH of the resulting solution is adjusted to 4 by addition of glacial acetic acid and the resulting solution is then heated to about 50°C for 5 minutes to destroy the cyanide complexes. No loss of cyanide is detected during the heating as indicated by the absence of any odor of HCN.

The solution is then cooled to ambient temperature, and the pH of the solution is adjusted to 11 by addition of 5M KOH aqueous solution. Cyanide sensing electrode and potassium sensing electrode (respectively Model Nos. 94-06 and 97-19 identified above) are inserted into the samples, and potential reading is taken and compared to the initial values recorded in step (A). The potential readings are the same indicating that all the cyanide in the solution is present as free ions.

EXAMPLE II

The procedures of Example I are repeated with sample solutions containing metal complexes each having $7.6 \times 10^{-5}$ cyanide, with measured results as follows:

| Metal | EDTA | CN found | % error |
| --- | --- | --- | --- |
| $2 \times 10^{-3}$ $Cd^{++}$ | 0.2 M | 2.05 | 2.5 |
| $2 \times 10^{-3}$ $Cr^{+++}$ | 0.2 M | 1.95 | 2.5 |
| $1 \times 10^{-3}$ $Cu^{++}$ | 0.05 M | 2.0 | 0 |
| $1 \times 10^{-3}$ $Ni^{++}$ | 0.05 M | 1.95 | 2.5 |
| $1 \times 10^{-3}$ $Zn^{++}$ | 0.05 M | 1.95 | 2.5 |

EXAMPLE III

The procedure of Example I is repeated with sample solutions containing metal complexes each having chanide at $7.6 \times 10^{-6}$M, with the following results:

| Metal | EDTA | CN found | % error |
| --- | --- | --- | --- |
| $1 \times 10^{-4}$ $Cd^{++}$ | 0.02 M | 0.205 | 2.5 |
| $1 \times 10^{-4}$ $Cr^{+++}$ | 0.02 | 0.20 | 0 |
| $1 \times 10^{-4}$ $Cu^{++}$ | 0.02 M | 0.205 | 2.5 |
| $1 \times 10^{-4}$ $Ni^{++}$ | 2.02 M | 0.20 | 0 |
| $1 \times 10^{-4}$ $Zn^{++}$ | 0.02 M | 0.21 | 5.0 |

Since certain changes may be made in the above method without departing from the scope of the invention herein involved, it is intended that all matter contained in the above description or shown in the accompanying drawings shall be interpreted in an illustrative and not in a limiting sense.

What is claimed is:

1. Method of decomplexing a cyanide complex of $Cu^+$, $Ni^{++}$ or $Cr^{+++}$ in aqueous solution preparatory to electrochemical measurement of cyanide ion activity, comprising the steps of heating an acidified solution of said cyanide complex in the presence of a water-soluble sequestering agent at a temperature below the boiling point of said acidified solution for a sufficient time to effect substantially complete dissociation of said cyanide from said complex, said sequestering agent being capable of forming, with the metal of said complex, a complex having a stability constant of sufficient magnitude relative to the stability constant of the corresponding cyanide complex so that the cyanide is freed into said solution from its complex and thereafter adjusting the pH of the solution to a basic value in excess of about 10 so that substantially all of the cyanide in the solution remains in the form of free ions.

2. A method as defined in claim 1 wherein said solution is acidified to a value short of precipitating said agent, by an acid which is non-oxidizing with respect to said agent.

3. A method as defined in claim 1 wherein said solution is adjusted to an acid pH value not substantially greater than about 4.

4. A method as defined in claim 1 wherein said acidified solution is heated at a temperature in the range of about 50°–90° from about 1 to 20 minutes.

5. A method as defined in claim 1 wherein said sequestering agent is selected from the group consisting of water soluble salts of ethylene diamine tetraacetic acid and cyclohexyl diamine tetraacetic acid.

* * * * *